(12) United States Patent
Usami

(10) Patent No.: US 8,379,626 B2
(45) Date of Patent: Feb. 19, 2013

(54) WIRELESS COMMUNICATION TERMINAL AND BASE STATION SELECTION METHOD

(75) Inventor: Hideaki Usami, Yokohama (JP)

(73) Assignee: Kyocera Corporation, Kyoto (JP)

( * ) Notice: Subject to any disclaimer, the term of this patent is extended or adjusted under 35 U.S.C. 154(b) by 882 days.

(21) Appl. No.: 12/447,427

(22) PCT Filed: Sep. 19, 2007

(86) PCT No.: PCT/JP2007/068200
§ 371 (c)(1),
(2), (4) Date: Apr. 27, 2009

(87) PCT Pub. No.: WO2008/050559
PCT Pub. Date: May 2, 2008

(65) Prior Publication Data
US 2010/0054216 A1    Mar. 4, 2010

(30) Foreign Application Priority Data
Oct. 27, 2006   (JP) ................................ 2006-292157

(51) Int. Cl.
*H04J 3/06* (2006.01)
(52) U.S. Cl. ....................................................... 370/350
(58) Field of Classification Search ................. 370/350
See application file for complete search history.

(56) References Cited

U.S. PATENT DOCUMENTS

| | | | | |
|---|---|---|---|---|
| 6,052,602 A | * | 4/2000 | Yamamoto | 455/525 |
| 6,587,444 B1 | * | 7/2003 | Lenzo et al. | 370/330 |
| 2003/0045299 A1 | | 3/2003 | New | 455/455 |
| 2003/0045300 A1 | * | 3/2003 | New | 455/455 |
| 2004/0128095 A1 | | 7/2004 | Oestreich | 702/89 |
| 2006/0234756 A1 | * | 10/2006 | Yamasaki et al. | 455/525 |

FOREIGN PATENT DOCUMENTS

| | | |
|---|---|---|
| JP | 08-186857 | 7/1996 |
| JP | 2004-297527 | 10/2004 |
| JP | 2006-295664 | 10/2006 |

* cited by examiner

*Primary Examiner* — Mark Rinehart
*Assistant Examiner* — Maharishi Khirodhar
(74) *Attorney, Agent, or Firm* — DLA Piper LLP (US)

(57) ABSTRACT

A wireless communication terminal, in accordance with a time division multiple access system, establishes radio-links to multiple base stations and conducts a communication by using slots assigned by the multiple base stations, including: a synchronization information acquisition means generating synchronization information regarding slots used between the wireless communication terminal and multiple base stations that are candidates to which a communication is conducted; and a selection means, based on the synchronization information, classifies the multiple base stations into multiple synchronized base station groups which include the base stations that provides synchronized slots, and selects one of the synchronized base station groups including the bases stations that are candidates to which the radio-link is established.

5 Claims, 6 Drawing Sheets

WIRELESS COMMUNICATION TERMINAL AND BASE STATION SELECTION METHOD

TECHNICAL FIELD

The present invention relates to a wireless communication terminal and a base station method.

This application is a national stage of international application No. PCT/JP2007/068200, filed on Sep. 19, 2007. Priority is claimed on Japanese Patent Application No. 2006-292157, filed Oct. 27, 2006, the content of which is incorporated herein by reference.

BACKGROUND ART

As generally known, the Time Division Multiplex Access (TDMA) system is one of wireless communication methods, and in the TDMA, a wireless carrier is divided into multiple units which are called "slots" in accordance with a predetermined time period (one time period is called a "frame"), and each of the slots is assigned to each of the users (wireless communication terminals) as a channel for conducting a communication.

In a wireless communication system using the above-described TDMA system, there is a method for improving a data transmission speed in which one terminal establishes radio-links to multiple base stations, each of the base stations assigns at least one slot as a communication channel to the terminal, and the terminal conducts a communication by using multiple communication channels (slots) assigned by the multiple base stations.

For example, Patent Document 1 shown below discloses both multiple base stations and a base station selection method of a wireless communication system including a mobile station which can simultaneously connect to the multiple base stations, and in the base station selection method, the mobile station synthesizes signals received from the multiple base stations at a predetermined electric power, estimates a communication quality after synthesizing of a wireless communication line to each of the simultaneously connected base stations and conducts a base station connection control based on the estimation results.

[Patent Document 1] Japanese Patent Application, First Publication No. H08-186857

However, in general, a terminal provides only one TDMA timing function and cannot establish radio-links to the multiple base stations if there are differences or gaps of a slot synchronization between the base stations, and as a result, there is a problem in which it is not possible to achieve a desired data transmission speed.

The present invention was conceived in order to solve the above-described problem and has an object to achieve a desired data transmission speed by establishing radio-links to the multiple base stations if there is a difference or gap between slot synchronization between multiple base stations.

DISCLOSURE OF INVENTION

In order to achieve the above-described objects, in a first solution of the present invention, a wireless communication terminal which, in accordance with a time division multiple access system, establishes radio-links to multiple base stations and conducts a communication by using slots assigned by the multiple base stations, including: a synchronization information acquisition means generating synchronization information regarding slots used between the wireless communication terminal and multiple of base stations that are candidates to which a communication is conducted; and a selection means, based on the synchronization information, classifies the multiple base stations into multiple synchronized base station groups which include the base stations that provides synchronized slots, and selects one of the synchronized base station groups including the bases stations that are candidates to which the radio-link is established.

A second solution of the present invention provides a wireless communication terminal of the above-described first solution, wherein the synchronization information acquisition means, in a search time interval in which the base stations that are candidates to which communication is conducted are searched, generates the synchronization information including both a reception time period of control signals transmitted in a predetermined time period from the base stations that are candidates to which communication is conducted via control channel slots and base station identification information included in the control signals.

A third solution of the present invention provides a wireless communication terminal of the above-described first or second solution, wherein the selection means assigns priority to the multiple synchronized base station groups after classifying the base stations, and selects the synchronized base station group with the highest priority to which the radio-link is established.

A fourth solution of the present invention provides a wireless communication terminal of the above-described third solution, wherein, when the communication terminal cannot achieve a desired communication speed when communicating with the selected base station group to which the radio-link is established, the selection means newly selects another base station group with a secondary higher priority to which the radio-link is established.

A fifth solution of the present invention provides a wireless communication terminal of the above-described third or fourth solution, wherein the selection means assigns a comparatively higher priority to the synchronized base station group when the synchronization base station group has comparatively larger number of base stations.

A sixth solution of the present invention provides a wireless communication terminal of the above-described third or fourth solution, wherein the selection means assigns a comparatively higher priority to the synchronized base station group when the synchronized base station group includes a comparatively larger number of base stations and has a comparatively larger degree of unevenness of slot numbers of the control signals transmitted at a predetermined frequency via the control channel slot from the base station included in the synchronized base station group.

On the other hand, a solution of the present invention provides a base station selection means of a wireless communication terminal in which, in accordance with a time division multiple access system, radio-links to multiple base stations are established and a communication is conducted by using slots assigned by the multiple base stations, including: a step of generating synchronization information regarding slots used between the wireless communication terminal and multiple base stations that are candidates to which a communication is conducted; and a step of, based on the synchronization information, classifying the multiple base stations into multiple synchronized base station groups which include the base stations that provides synchronized slots; and a step of selecting one of the synchronized base station groups including the bases stations that are candidates to which the radio-link is established.

In accordance with the present invention, it is possible to achieve a desired data transmission speed by establishing radio-links to the multiple base stations if there is a difference or gap between slot synchronization between multiple base stations.

DESCRIPTION OF THE REFERENCE SYMBOLS

Figure 1:
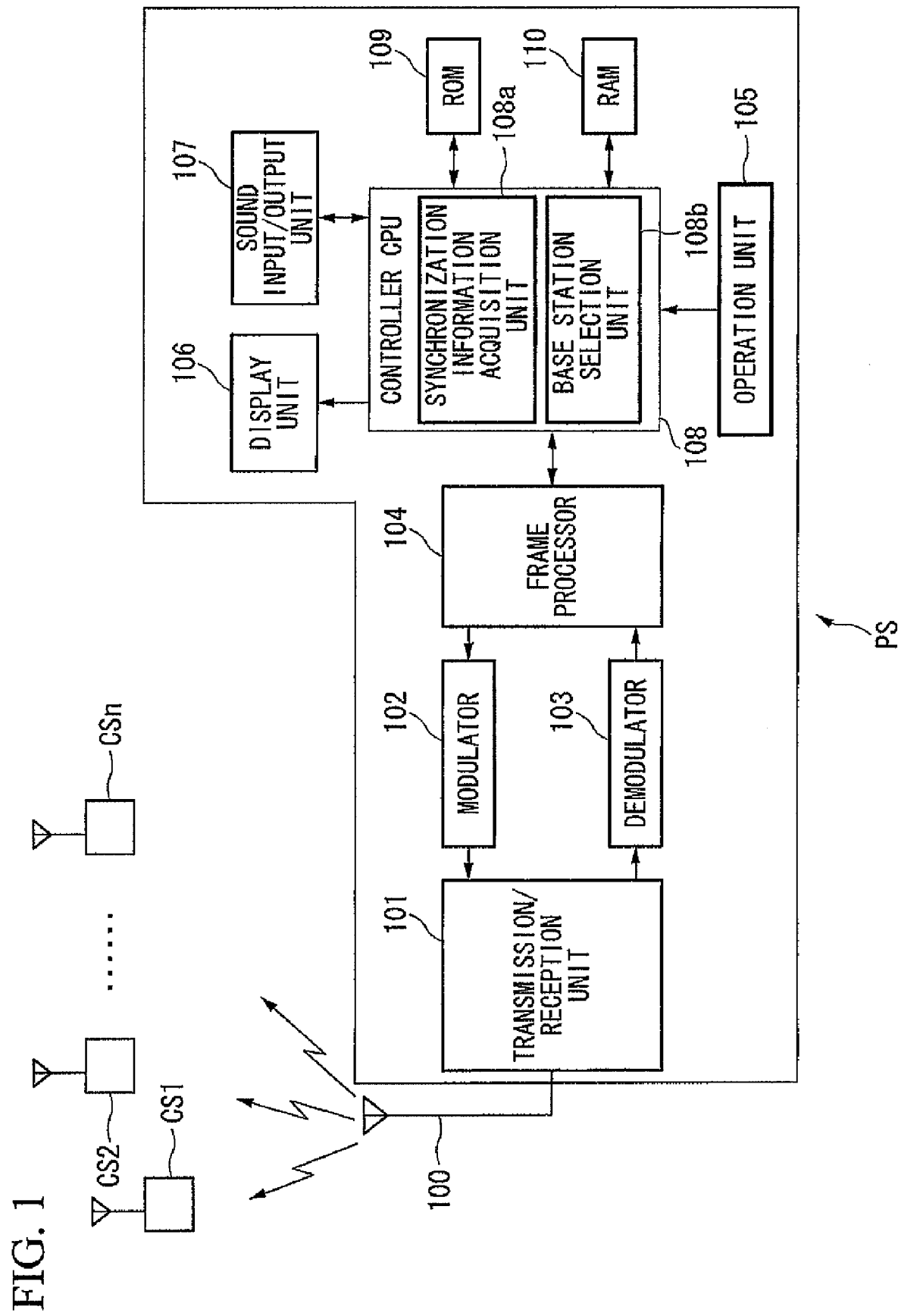
FIG. 1 is a constitutional block diagram of a wireless communication terminal (terminal PS) of one embodiment of the present invention.

PS . . . wireless communication terminal (terminal)
100 . . . antenna
101 . . . transmission/reception unit
102 . . . modulator
103 . . . demodulator
104 . . . frame processor
105 . . . operation unit
106 . . . display unit
107 . . . sound input/output unit
108 . . . controller CPU (Central Processing Unit)
109 . . . ROM (Read Only Memory)
110 . . . RAM (Random Access Memory)
108a . . . synchronization information acquisition unit (synchronization information acquisition means)
108b . . . base station selection unit (selection means)

BEST MODE FOR CARRYING OUT THE INVENTION

Hereinafter, one embodiment of the present invention is explained in detail in reference to the drawings. FIG. 1 is a constitutional block diagram of a wireless communication terminal PS hereinafter, PS) of one embodiment. It should be noted that the terminal PS uses the Time Division Multiple Access (TDMA) system as a communication method, and in addition, from base stations CS1-CSn which are candidates of conducting a communication, the terminal PS selects multiple base stations to which a radio-link is established in accordance with a base station selection operation described below and conducts a communication by using multiple communication channels (slots) assigned by each of the base stations to which a radio-link is established.

As shown in FIG. 1, the terminal PS includes: an antenna 100; a transmission/reception unit 101; a modulator 102; a demodulator 103; a frame processor 104; an operation unit 105; a display unit 106; a sound input/output unit 107; a controller CPU (Central Processing Unit) 108; a ROM (Read Only Memory) 109; and a RAM (Random Access Memory) 110.

The antenna 100 transmits the transmission signals input from the transmission/reception unit 101 to the base stations CS1-CSn, and outputs the received signal transmitted from the base stations CS1-CSn to the transmission/reception unit 101. The transmission/reception unit 101, on modulated signals output from the modulator 102, conducts both amplification and frequency conversion to the RF frequency band, and outputs the transmission signals to the antenna 100. In addition, the transmission/reception unit 101, on the received signals input from the antenna 100, conducts both amplification and frequency conversion to the IF frequency band, and outputs the IF received signals to the demodulator 103.

The modulator 102 conducts a modulation on transmission baseband signals input from the frame processor 104 by applying a predetermined modulation method, for example, $\pi/4$ shift QPSK (Quadrature Phase Shift Keying), and outputs the modulated signals to the transmission/reception unit 101. The demodulator 103 conducts a demodulation on the IF received signal output from the transmission/reception unit 101 and outputs the reception baseband signals to the frame processor 104.

Under a control by the controller CPU 108, via the modulator 102, transmission/reception unit 101 and antenna 100, the frame processor 104 transmits the transmission baseband signals input from the controller CPU 108 in accordance with a predetermined TDMA time period (TDMA time period is determined by the slots). In addition, via the antenna 100, transmission/reception unit 101 and the demodulator 103, the frame processor 104 receives the reception baseband signals in accordance with a predetermined TDMA time period and outputs the reception baseband signals to the controller CPU 108.

The operation unit 105 is constituted from various operation keys, for example, a power key, various function keys and a numeric keypad, and outputs the operation signals to the controller CPU 108 based on inputting operations on the operation keys. The display unit 106 is, for example, a liquid crystal monitor or an organic EL monitor, and shows predetermined images and characters based on display signals output from the controller CPU 108. The sound input/output unit 107 is constituted from both a microphone and a speaker, converts the external sound received via the microphone to digital signals, outputs the digital signals to the controller CPU as the input sound signals, and output the output sound signals input from the controller CPU 108 as the external sound via the speaker.

The controller CPU 108 controls overall operations of the terminal PS based on, for example, control programs stored in the ROM 109, the reception baseband signals input from the frame processor 104, the operation signals input from the operation unit 105 and the input sound signals input from the sound input/output unit 107. In addition, the controller CPU 108 includes: the synchronization information acquisition unit 108a (synchronization information acquisition means) which generates the synchronization information of the slots between the multiple base stations that are candidates to communicate with and records the synchronization information in the RAM 110; and the base station selection unit 108b (selection means) classifies (assorts) the multiple base stations into multiple synchronized base station groups which include the base stations with synchronized slots and selects the largest synchronized base station group that is a candidate to which a radio-link is established.

The ROM 109 stores, for example, the control program and other nonvolatile data which are used by the controller CPU 108. The RAM 110 is used as a temporal buffer for temporally storing the data that is used for various operations of the controller CPU 108 and stores the synchronization information in accordance with a request from the synchronization information acquisition unit 108a.

Figure 2:
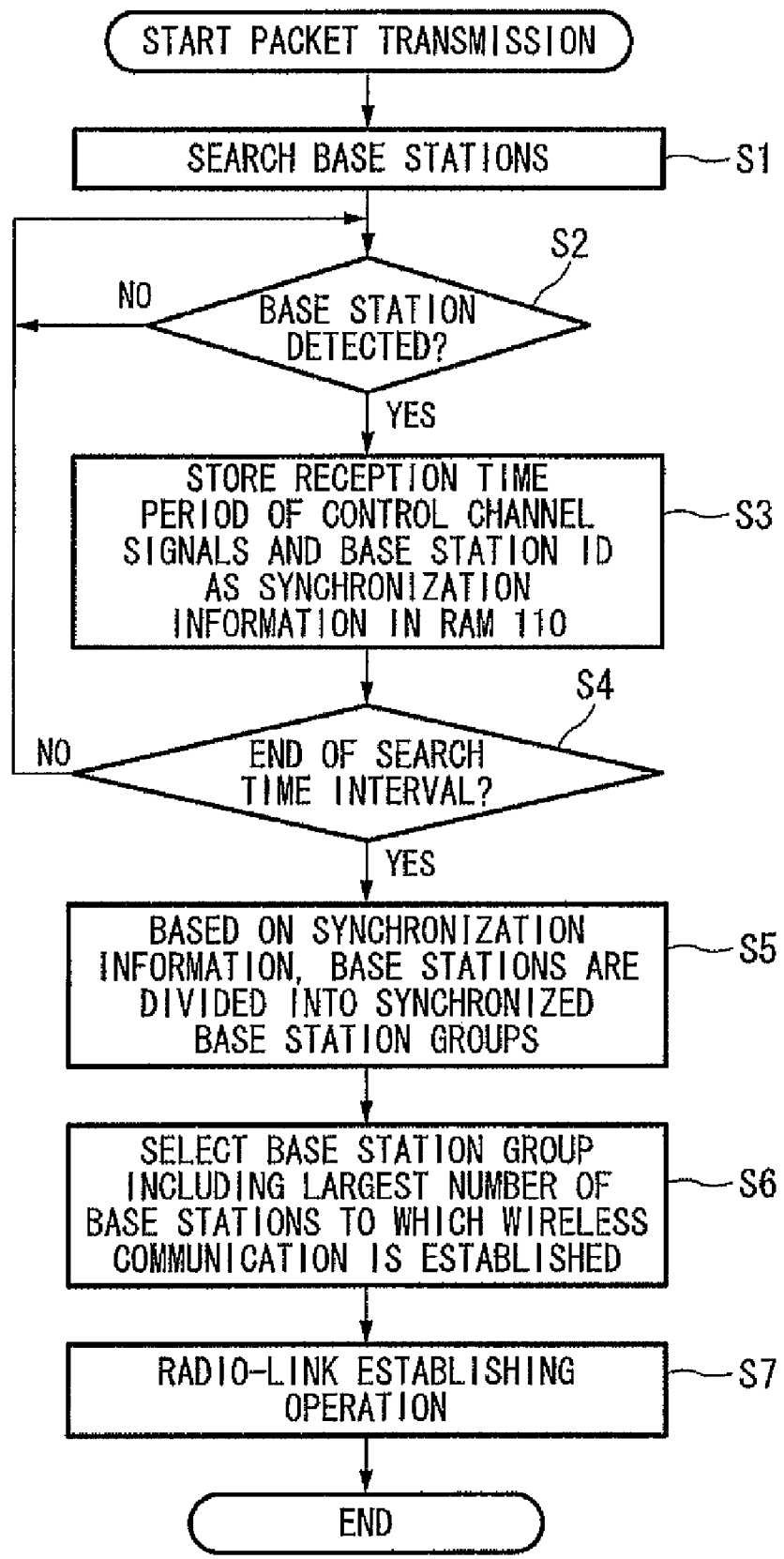
FIG. 2 is a flowchart showing a base station selection operation of a terminal PS of one embodiment of the present invention.

In reference to the flowchart of FIG. 2, an operation of the terminal PS constituted in the above-described manner, specially, a selection operation of the base stations to which the radio-link is established is explained.

First, if the controller CPU 108 of the terminal PS inputs the operation signal from the operation unit 105 that request to start transmitting packets, the controller CPU 108 controls the frame processor 104 to conducts a searching operation for a certain search time interval on the base stations CS1-CSn that are candidates of communication. In a concrete case, the controller CPU 108 catches control channels (CCH) periodically transmitted from the bases stations CS1-CSn and conducts a searching operation to determine the candidates included in the base stations CS1-CSn to communicate with.

After this, the controller CPU 108 determines whether or not the base stations are detected, that is, whether or not the reception baseband signals corresponding to the control channel signals are received via the frame processor 104 (Step S2), and in addition, if the base station is not detected ("No"), the controller CPU 108 continues the searching operation. On the other hand, in Step S2, if the base station is detected ("Yes"), the synchronization information acquisition unit 108a provides the synchronization information of both the reception time period of the control channel signals and the base station ID included in the reception baseband signals corresponding to the control signals, and stores the synchronization information in the RAM 110 (Step S3). It should be noted that the base station ID is included in the control channel signals as the base station information, but the reception time period is not included in the base station information, hence, in a practical case, the reception time period is measured by using a timer function.

After this, the controller CPU 108 determines whether or not the searching time period of the base stations is ended (Step S4), and in addition, if the searching time period is not ended ("No"), the controller CPU 108 conducts the operation of Step S2. In other words, in accordance with the operations of Steps S1-S4, the synchronization information (base station ID and reception time period of the control channel signals) of the base stations detected in the searching time period is stored in the RAM 110.

On the other hand, in Step S4, if the searching time period is ended ("Yes"), the base station selection unit 108b reads the synchronization information stored in the RAM 110 and classifies the base stations into multiple synchronized base station groups which include the base stations with synchronized slots (Step S5).

Figure 3:
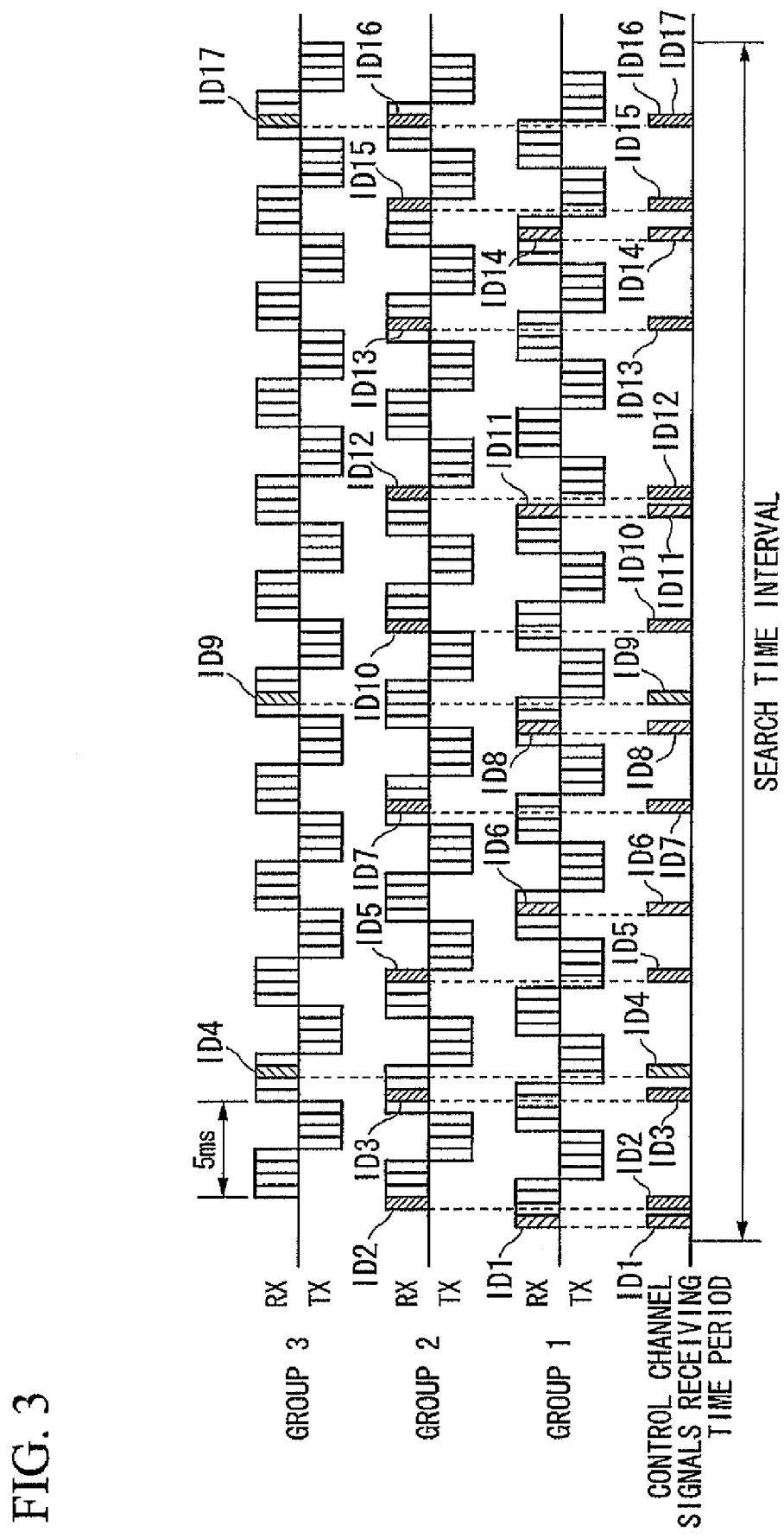
FIG. 3 is a first supplemental explanation drawing of a base station selection operation of a terminal PS of one embodiment of the present invention.

An operation of Step S5 is concretely explained in reference to FIG. 3. FIG. 3 shows an example of the reception time period of the control channel signals received in the searching time period. In FIG. 3, an axis in a horizontal direction is a time axis, "RX" are down-link slots, and "TX" are up-link slots. In this embodiment, four slots are used for each of the up-link and down-link, and one of four slots is assigned as a control channel slot. In other words, the control channel signals received in the searching time period is transmitted from the base stations by using the control channel slot of the down-link. It should be noted that there is an assumption in which one frame is 5 ms, and a time width of one slot is 625 μs.

Here, in order to explain in a simple manner, a case is assumed in which the control channel signals are received in accordance with an order of the base station ID, for example, "ID1", "ID2", . . . , "ID17". If there are multiple base stations that have synchronized slots each other, reception intervals of the control channel signals should be multiples of 625 μs. In other words, first, the base station ID of the control channel signal is searched for which is received at a time of multiples of 625 μs based on a reception time period of the control channel signal of the base station ID "ID1". In an example of FIG. 3, the reception time periods of the base station ID "ID6", "ID8", "ID11" and "ID14" are multiples of 625 μs based on a reception time period of the control channel signal of "ID1", hence, the base station ID "ID6", "ID8", "ID11" and "ID14" are included in a synchronized base station group which has synchronized slots. This synchronized base station group is "group 1".

After this, the base station ID of the control channel signal is searched for which is received at a time of multiples of 625 μs based on a reception time period of the control channel signal of the base station ID "ID2". In an example of FIG. 3, the reception time periods of the base station ID "ID3", "ID5", "ID7", "ID10", "ID12", "ID13", "ID15" and "ID16" are multiples of 625 μs based on a reception time period of the control channel signal of "ID2", hence, the base station ID "ID3", "ID5", "ID7", "ID10", "ID12", "ID13", "ID15" and "ID16" are included in a synchronized base station group which has synchronized slots. This synchronized base station group is "group 2".

Figure 6:
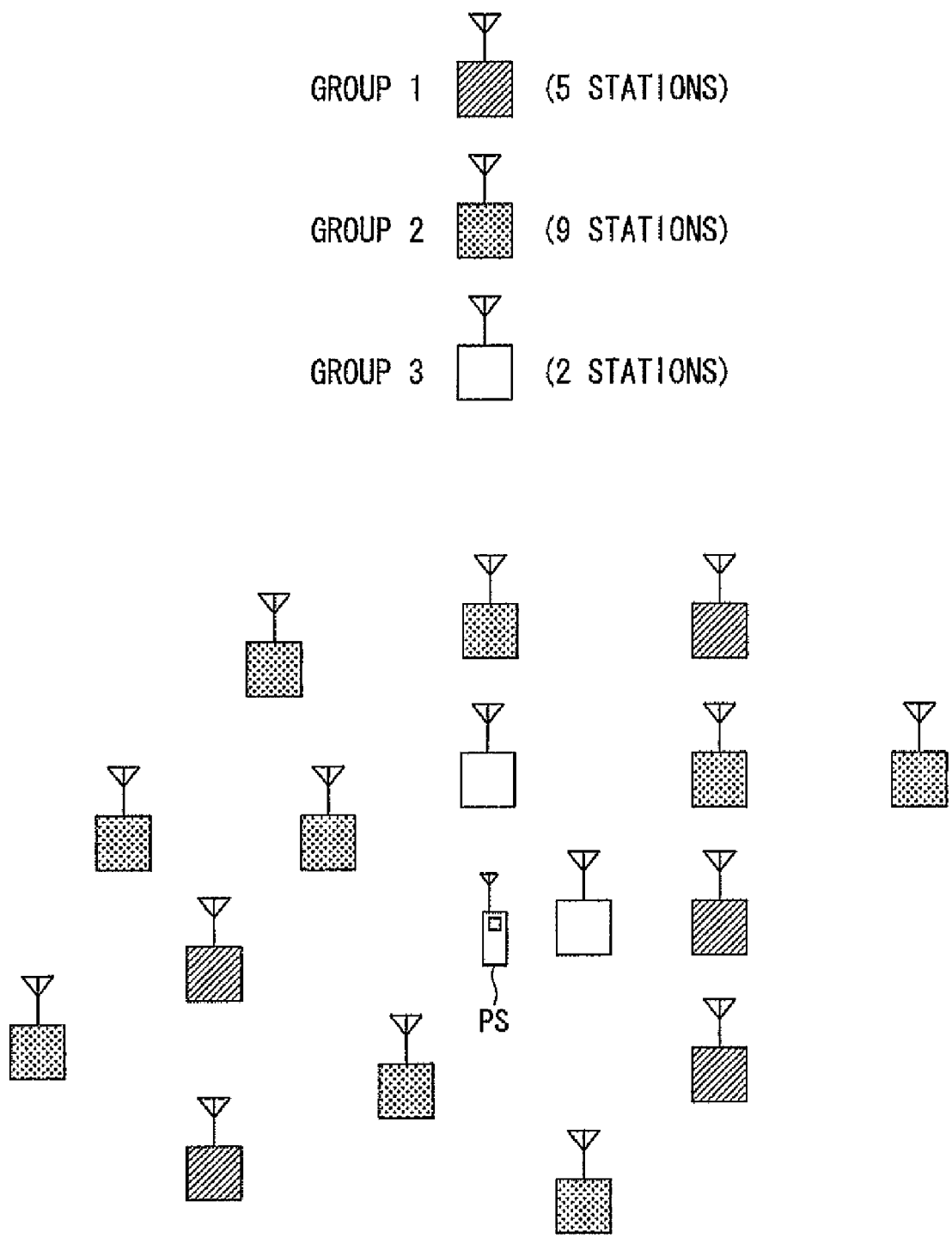
FIG. 6 is a fourth supplemental explanation drawing of a base station selection operation of a terminal PS of one embodiment of the present invention.

After this, the base station ID of the control channel signal is searched for which is received at a time of multiples of 625 μs based on a reception time period of the control channel signal of the base station ID "ID4" (the base station ID "ID3" belongs to the group 2, hence, here, base stations belong to a group of the base station ID "ID4" are searched for). In an example of FIG. 3, the reception time periods of the base station ID "ID9" and "ID17" are multiples of 625 μs based on a reception time period of the control channel signal of "ID4", hence, the base station ID "ID9" and "ID17" are included in a synchronized base station group which has synchronized slots. It should be noted that the control channel signal of the bases station ID "ID17" received at an end portion of the searching period is received at a time when the control channel signal of the bases station ID "ID16" is received, hence, in a practical case, it is not possible to detect the control channel signal of the bases station ID "ID17". Therefore, a synchronized group "group 3" includes the bases station ID "ID4" and "ID9". In other words, as shown in FIG. 6, the terminal PS detects five synchronized bases stations of the group 1, nine synchronized base stations of the group 2 and two synchronized base stations of the group 3.

In accordance with the above-described operations, based on the synchronization information stored in the RAM 110, the base station selection unit 10b classifies the base stations including synchronized slots into synchronized base station groups. Here, the base station selection unit 108b assigns a comparatively high priority to the synchronized base station group which includes a comparatively large number of the synchronized base stations. In other words, the highest priority is assigned to the group 2, and a secondary priority is assigned to the group 1, and the lowest priority is assigned to the group 3.

After this, the base station selection unit 108b selects the group having the highest priority (including the largest number of synchronized base stations) between the synchronized base station groups classified in accordance with the above-described manner, and the selected group includes the base stations to which the radio-link is established (Step S6). In other words, in an Example shown in FIG. 3, the group 2 is selected which includes nine synchronized base stations and to which the radio-ink is established. After this, the controller CPU 108 starts an operation of establishing a radio-link to the group 2 which is selected by the base station selection unit 108b (Step S7).

Figure 4:
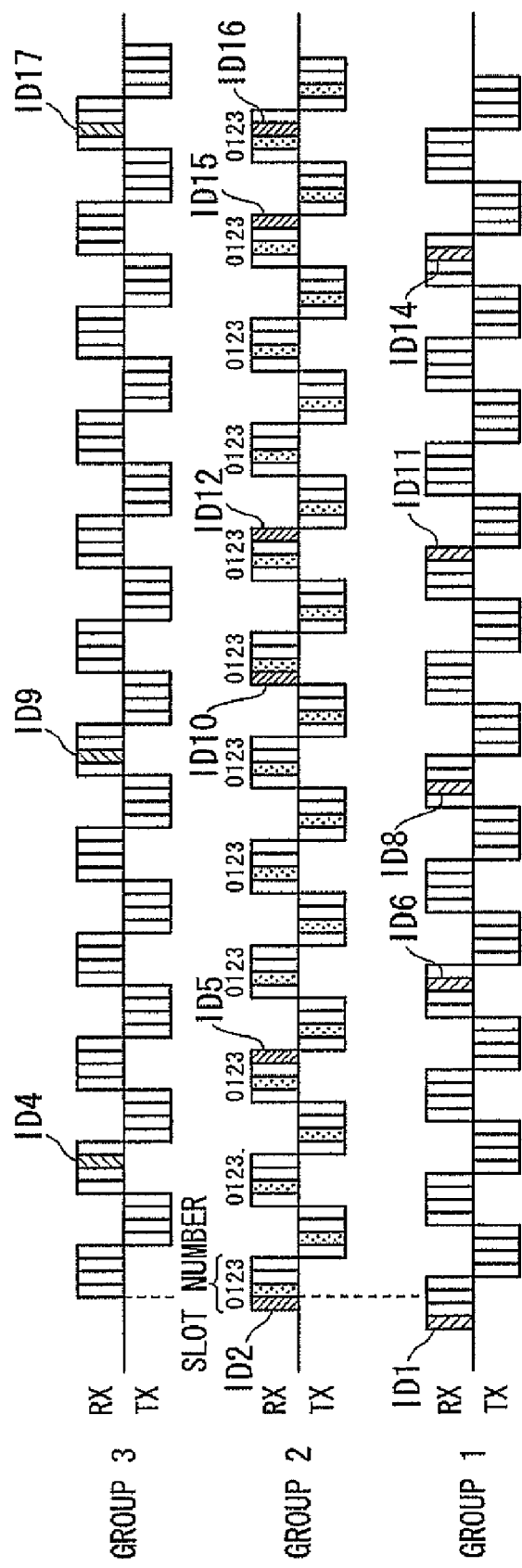
FIG. 4 is a second supplemental explanation drawing of a base station selection operation of a terminal PS of one embodiment of the present invention.

FIG. 4 shows a chart of slot time after selecting the group 2 as the base stations to which the radio-link is established and establishing the communication channel by using a slot number "1". The terminal PS is communicating with the base stations of the group 2, and it is not possible to detect the base stations of the groups 1 and 3 while reserving the communication channel (impossible to receive the control channel signals). In addition, as shown in FIG. 4, while reserving the communication channel of the slot number "1", it id possible to receive the control channel signals corresponding to the base station ID "ID2", "ID5", "ID10", "ID12", "ID15" and "ID16" from six base stations.

Figure 5:
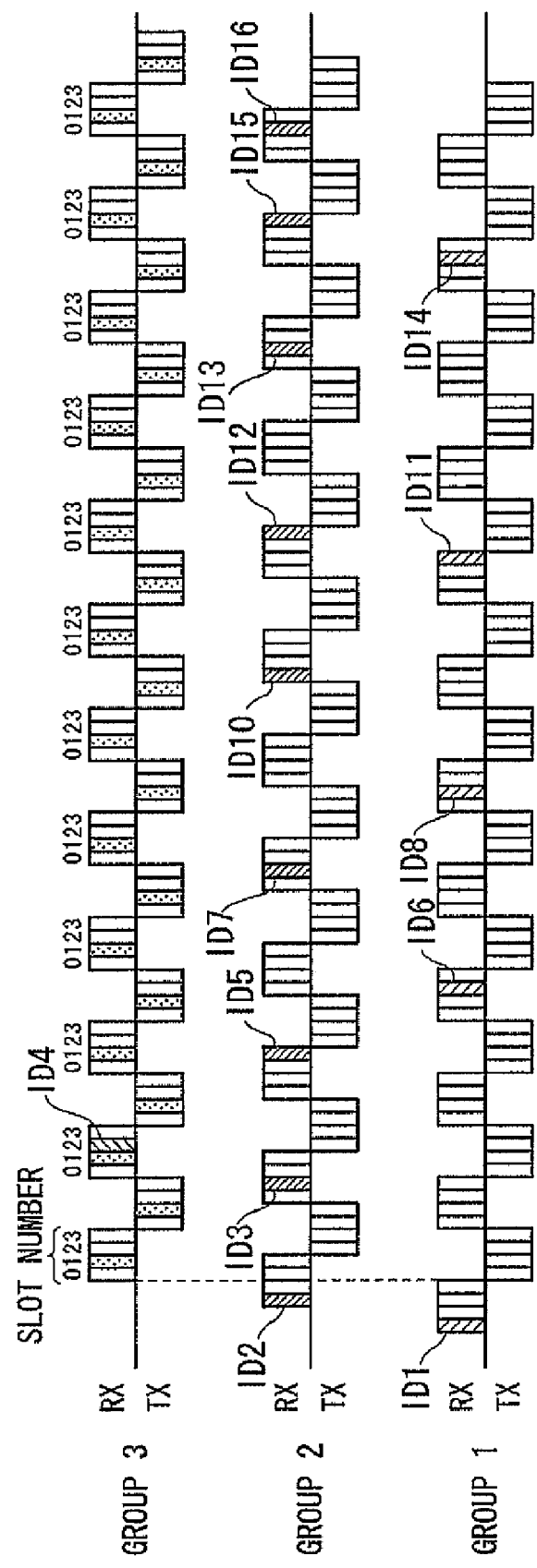
FIG. 5 is a third supplemental explanation drawing of a base station selection operation of a terminal PS of one embodiment of the present invention.

On the other hand, FIG. 5 shows a chart of slot time in a case in which the group 3 including the smallest number of the synchronized base stations is selected as the base stations to which the radio-link is established and in which the communication channel is established by using a slot number "1,". As shown in FIG. 5, when the group 3 is selected as the base stations to which the radio-link is established, while reserving the communication channel of the slot number "1", it id possible to receive the control channel signals corresponding to the base station ID "ID4" from one base station.

As described above, in accordance with the terminal PS of this embodiment, if there is a difference or gap between slot synchronization between multiple base stations, it is possible to assign a comparatively larger number of slots because, by selecting a group including a large number of synchronized base stations as the base stations to which a radio-link is established, it is possible to increase a number of base stations which can be selected when applying a comparatively larger number of slots to the communication. As a result, it is possible to achieve a desired data communication speed.

It should be noted that, as shown in FIG. 4, there is a possibility in which a number of base stations that can be used to communicate is reduced because there may be a slot number for the communication channel assigned to the terminal PS that is the same slot as the control channel. Therefore, when assigning the priority to the synchronized base station groups, it is better to assign a comparatively higher priority to the priority to the synchronized base station group if it includes a comparatively large number of base stations and if a degree of unevenness of slot numbers is comparatively larger regarding the control channel signals transmitted from the base stations of the synchronized base station group. Here, regarding a comparatively larger degree of unevenness of the slot numbers of the control channels, for example, in the group 2 of FIG. 4, the slot number corresponding to ID2 is 0, the slot number corresponding to ID5 is 3, the slot number corresponding to ID10 is 0, the slot number corresponding to ID12 is 3, the slot number corresponding to ID15 is 3, and the slot number corresponding to ID16 is 2. Compared to the group 2, in the group 3, the slot number corresponding to ID4 is 2, the slot number corresponding to ID9 is 1, and the slot number corresponding to ID17 is 1. In such a case, the group 2 has a larger unevenness of the slot numbers than the group 3, and the group 2 has a larger degree of unevenness of the slot numbers than the group 3. In such a case, when a degree of unevenness of the slot numbers of the control channel signals is large, a probability of overlapping between the communication channel slots and the control channel slots is comparatively lower, hence, it is possible to prevent a number of base stations from reducing to which it is possible to communicate.

In addition, if it is not possible to achieve a desired data communication speed when communicating after establishing a radio-link to the synchronized base station group which has the highest priority because, for example, the above-described overlaps between the communication channel slots and the control channel slots arise many times, or the base station is in a busy state (all slots are engaged and used by other terminals), it is possible to disconnect the radio-link to the currently wireless-linked synchronized base station group, select another synchronized base station which has a secondly higher priority and establish a new radio-link to the selected synchronized base station group.

The invention claimed is:

1. A wireless communication terminal which, in accordance with a time division multiple access system, establishes radio-links to a plurality of base stations and conducts a communication by using slots assigned by the plurality of base stations, comprising:
   a synchronization information acquisition means generating synchronization information regarding slots used between the wireless communication terminal and a plurality of base stations that are candidates to which a communication is conducted; and
   a selection means, based on the synchronization information, classifying the plurality of base stations into a plurality of synchronized base station groups which include the base stations that provide synchronized slots, and selects one of the synchronized base station groups including the bases stations that are candidates to which the radio-link is established, wherein
   the synchronization information acquisition means, in a search time interval in which the base stations that are candidates to which communication is conducted are searched, generates the synchronization information including both base station identification information included in the control signals and a reception time period of control signals transmitted in a predetermined time period from the base stations that are candidates to which communication is conducted via control channel slots.

2. A wireless communication terminal according to claim 1, wherein the selection means assigns priority to the plurality of synchronized base station groups after classifying the base stations, and selects the synchronized base station group with the highest priority to which the radio-link is established.

3. A wireless communication terminal according to claim 2, wherein when the communication terminal cannot achieve a desired communication speed when communicating with the selected base station group to which the radio-link is established, the selection means newly selects another base station group with a secondary higher priority to which the radio-link is established.

4. A wireless communication terminal according to claim 2, wherein the selection means assigns a comparatively higher priority to the synchronized base station group when the synchronization base station group has comparatively larger number of base stations.

5. A wireless communication terminal according to claim 2, wherein the selection means assigns a comparatively higher priority to the synchronized base station group when the synchronized base station group includes a comparatively larger number of base stations and has a comparatively larger degree of unevenness of slot numbers of the control signals transmitted at a predetermined frequency via the control channel slot from the base station included in the synchronized base station group.

* * * * *